US012649464B2

(12) United States Patent
Onifade et al.

(10) Patent No.: US 12,649,464 B2
(45) Date of Patent: Jun. 9, 2026

(54) TELEMETRY-BASED LANE LINE ESTIMATION AND MAP INFERENCE METHOD AND SYSTEM

(71) Applicant: GM Global Technology Operations LLC, Detroit, MI (US)

(72) Inventors: Ibrahim Onifade, Katy, TX (US); Shu Chen, Rochester Hills, MI (US); Leila Ghorban Zadeh, Seattle, WA (US); Christian Haller, Austin, TX (US); Joon Hwang, Pflugerville, TX (US); Mason David Gemar, Cedar Park, TX (US); Fan Bai, Ann Arbor, MI (US); Gui Chen, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 291 days.

(21) Appl. No.: 18/587,106

(22) Filed: Feb. 26, 2024

(65) Prior Publication Data

US 2025/0269848 A1     Aug. 28, 2025

(51) Int. Cl.
B60W 30/12     (2020.01)
G01C 21/30     (2006.01)
G01S 19/01     (2010.01)
G06V 20/56     (2022.01)

(52) U.S. Cl.
CPC ............. B60W 30/12 (2013.01); G01C 21/30 (2013.01); G01S 19/01 (2013.01); G06V 20/588 (2022.01)

(58) Field of Classification Search
CPC ............ G01C 21/3815; G01C 21/3819; G01C 21/3804; G01C 21/3841; G01C 21/3859
See application file for complete search history.

(56) References Cited

U.S. PATENT DOCUMENTS

| | | | | |
|---|---|---|---|---|
| 2001/0056326 A1* | 12/2001 | Kimura | ................. | G01C 21/30 |
| | | | | 701/446 |
| 2019/0325739 A1* | 10/2019 | Dorum | .................... | G01S 19/51 |
| 2020/0208992 A1* | 7/2020 | Fowe | ................. | G01C 21/3811 |
| 2020/0393265 A1* | 12/2020 | Piao | .................. | G01C 21/3815 |

OTHER PUBLICATIONS

"CSMOUTE: Combined Synthetic Oversampling and Undersampling Technique for Imbalanced Data Classification", AGH University of Science and Technology, Apr. 2021 to Koziarski (Koz) (Year: 2021).*

* cited by examiner

*Primary Examiner* — Kenneth J Malkowski
(74) *Attorney, Agent, or Firm* — Vivacqua Crane, PLLC

(57) ABSTRACT

A method for estimating lane lines receiving, by a controller, telemetry data and map data. The method further includes matching the telemetry data with the map data to generate map-matched telemetry data and determining, using a gaussian mixture model (GMM), a first set of lane line points relating to the lane lines of the roadway within the predetermined region. Also, the method includes determining, using a lane-point detection (LPD) model, a second set of lane line points relating to the lane lanes of the roadway within the predetermined region and determining, using a lane-point clustering (LPC) model, a plurality of lane lines of the roadway based on the first set of lane line points and the second set of lane line points.

20 Claims, 2 Drawing Sheets

TELEMETRY-BASED LANE LINE ESTIMATION AND MAP INFERENCE METHOD AND SYSTEM

INTRODUCTION

The present disclosure generally relates to lane lines estimations and, more specifically, telemetry-based lane line estimation and map interference method and system.

Some autonomous vehicles can drive autonomously and maintain themselves within a lane. To do so, the autonomous vehicles should know where the lane lines are located within the roadway. It is therefore useful to develop method and systems to estimate the location of lane lines within a roadway.

SUMMARY

The present disclosure describes a method for estimating lane lines. The method includes receiving, by a controller, telemetry data. The telemetry data only contains vehicle positional data. The vehicle positional data includes GPS data. This method estimates lane line information from the original vehicle positional data. The method further includes receiving, by the controller, map data. The map data includes road-network topology data. The road-network topology data includes a map with information about the roadway within the predetermined region. The method further includes matching the telemetry data with the map data to generate map-matched telemetry data and determining, using a gaussian mixture model (GMM), a first set of lane line points relating to the lane lines of the roadway within the predetermined region. Further, the method includes determining, using a lane-point detection (LPD) model, a second set of lane line points relating to the lane lanes of the roadway within the predetermined region. A feature selection process is used to select the feature points before executing the LPC model to do the clustering. The selected points could be the first set, or the second set, or the mixed combination of the first set and the second set. For example, the LPC model may determine the shape, location, and extent of the lane lines of a roadway using the first set of lane line points and the second set of lane line points. Other embodiments of this aspect include corresponding computer systems, apparatus, and computer programs recorded on one or more computer storage devices, each configured to perform the actions of the methods. The method described in this paragraph improves vehicle technology by determining the shape and location of the lane lines of a roadway, thereby enhancing the navigation of the vehicle along the roadway.

In some aspects of the present disclosure, the method may include determining a local density map of the map-matched telemetry data. Also, the method may include dividing the map data into a predetermined number of cross-sections. The method may include determining a density distribution along the predetermined number of cross-sections using the local density map of the map-matched telemetry data. Executing the LPD model may include applying a second-order derivative filter to the density distribution along predetermined number of cross-sections to determine a gradient of the local density map of the map-matched telemetry data. Executing the LPD model includes determining the second set of lane line points relating to the lane lanes of the roadway within the predetermined region using the gradient of the local density map. Executing the LPD model includes determining a nominal path of the roadway within the predetermined region using the gradient of the local density map. Executing the LPD model includes determining a plurality of points attributes of the second set of lane line points used to determine a confidence level of the second set of lane line points. Executing the GMM may include receiving lidar map data or other suitable high-definition map data. The lidar map data includes a plurality of lidar points along the roadway within the predetermined region. The telemetry data includes a plurality of telemetry points. Executing the GMM may include receiving lidar map data and may also include determining a perpendicular distance from each of the plurality of telemetry points to a virtual line connecting an adjacent pair of the plurality of lidar points, generating a graph of the perpendicular distance versus the map-matched telemetry data, identifying a plurality of peaks in the graph of the perpendicular distance versus the map-matched telemetry data, determining a plurality of high-density areas using the plurality of peaks in the graph of the perpendicular distance versus the map-matched telemetry data, determining a plurality of center lines of the roadway within a predetermined region; and determining a plurality of lane edges of the roadway within a predetermined region. The method may include executing a synthetic gaussian oversampling undersampling technique (SG-OUT) to determine oversampling and undersampling of telemetry data. Implementations of the described techniques may include hardware, a method or process, or computer software on a computer-accessible medium.

The present disclosure also describes a system for estimating lane lines. The system includes a controller having a processor and a tangible, non-transitory, machine-readable medium in communication with the processor. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The present disclosure will be described in conjunction with the following figures, wherein like numerals denote like elements.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description.

As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
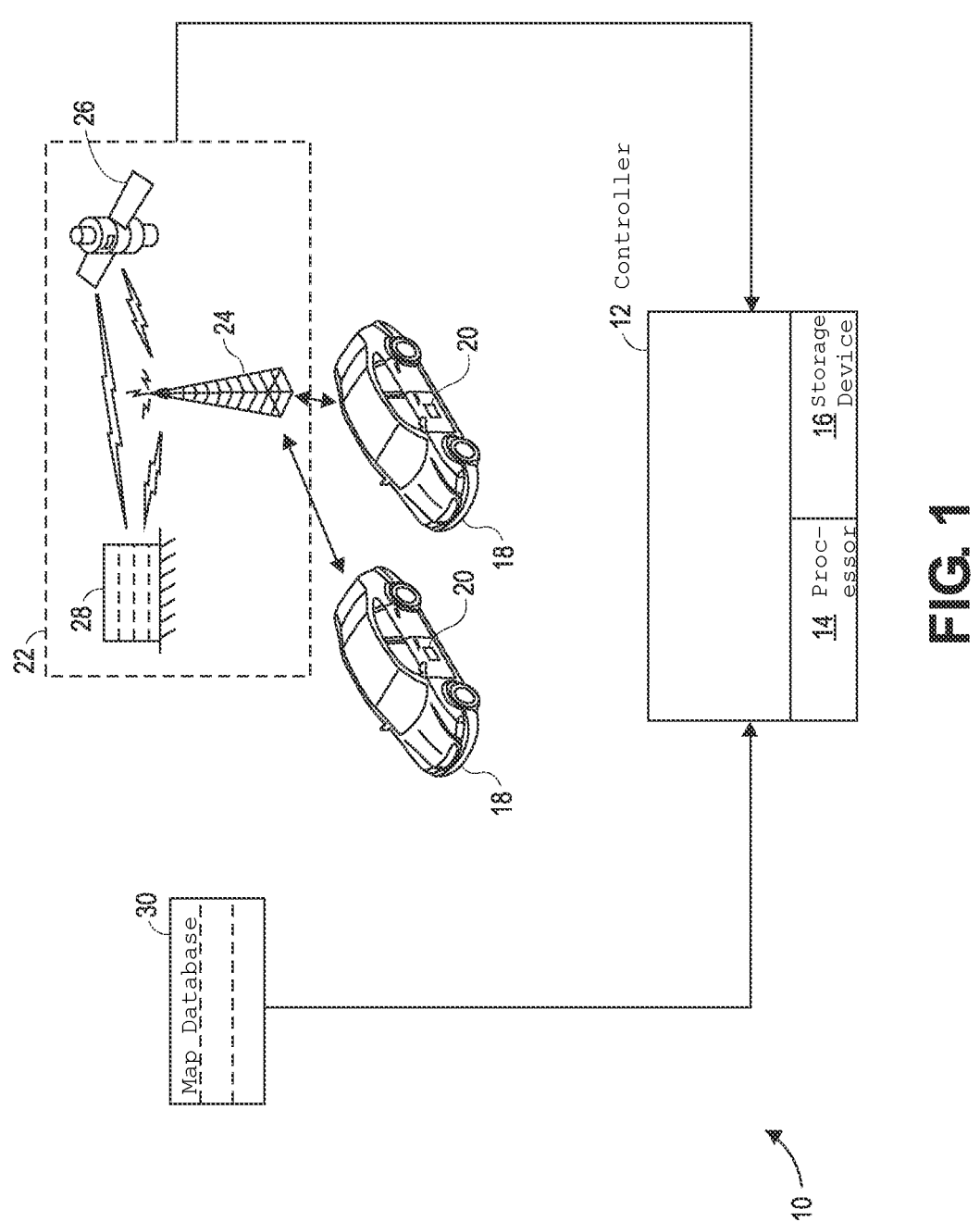
FIG. 1 is a schematic diagram of a system for estimating lane lines.
Figures 2, 3:
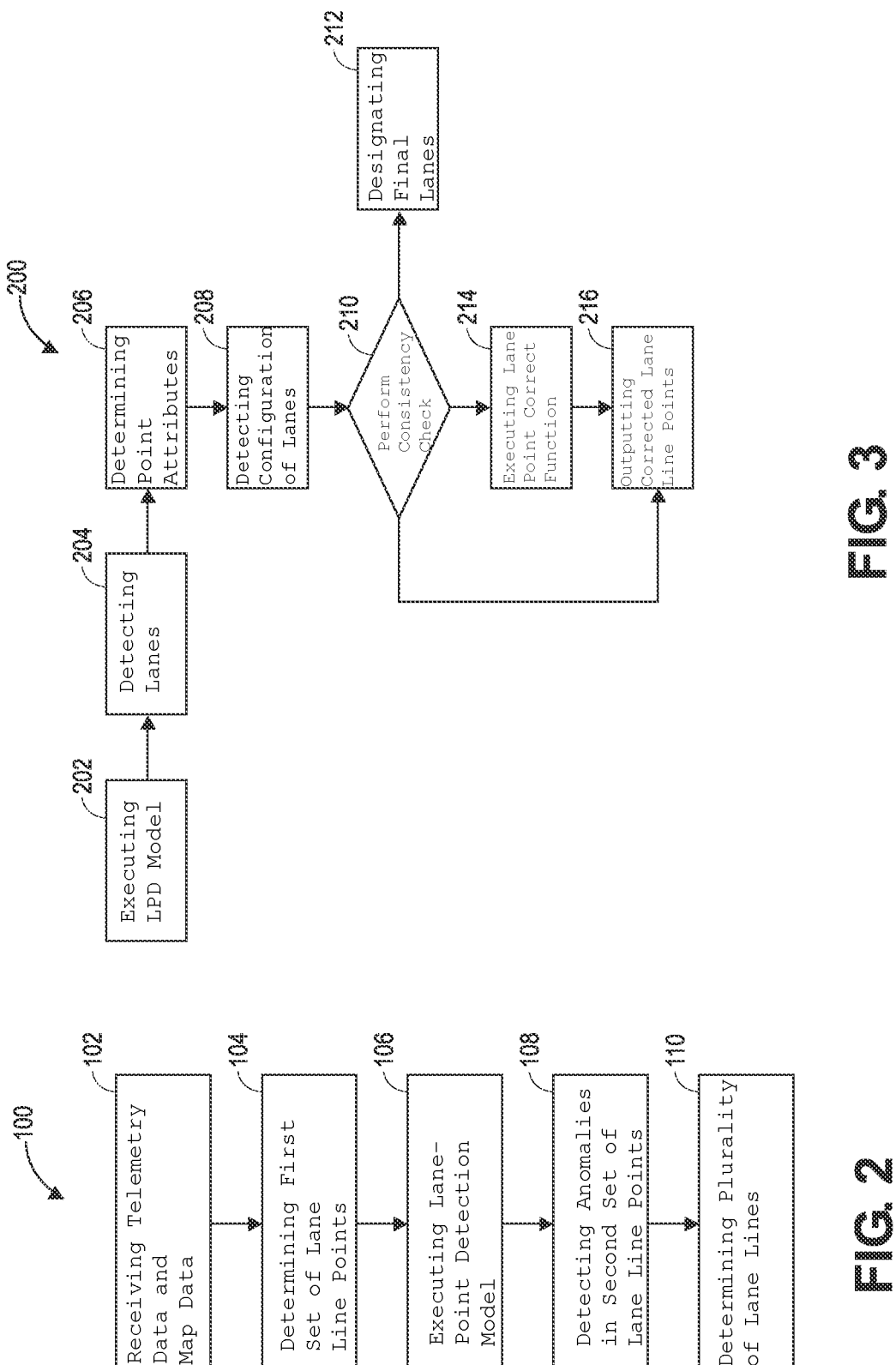
FIG. 2 is a flowchart of a method for estimating lane lines of a roadway.
FIG. 3 is a flowchart of a point anomaly detection and correction process.

With reference to FIG. 1, a control system 10 is configured to estimate the shape, geometry, and extent of lane lines of a roadway within a predetermined region. In The system 10 includes a controller 12. The controller 12 includes at least one processor 14 and a non-transitory computer readable storage device or media 16. The processor 14 may be a custom-made processor, a central processing unit (CPU), an auxiliary processor among several processors associated with the controller 12, a semiconductor-based microprocessor (in the form of a microchip or chip set), a macroprocessor, a combination thereof, or generally a device for executing instructions. The computer readable storage device or media 16 may include volatile and nonvolatile storage in read-only memory (ROM), random-access memory (RAM), and keep-alive memory (KAM), for example. KAM is a persistent or non-volatile memory that may be used to store various operating variables while the processor 14 is powered down. The computer-readable storage device or media 16 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 12. As discussed below, the controller 12 is programmed to execute the method 100 (FIG. 2).

The system 10 may further include or be in combination with one or more vehicles 18. Each vehicle 18 includes one or more vehicle sensors 20 that sense vehicle telemetry data. The vehicles 18 may be autonomous. The vehicle telemetry data of the vehicles 18 may include vehicle position (e.g., longitudinal and latitudinal coordinates from GPS data), vehicle speed, vehicle heading, among other attributes of the vehicles 18. To sense the vehicle telemetry data, the vehicle sensors 20 may include, but are not limited to, lidars, speedometers, radars, Global Positioning System (GPS) transceivers, odometers, one or more cameras (e.g., optical cameras and/or thermal cameras, such as a rear camera and/or a front camera), steering angle sensor, ultrasonic sensors, one or more inertial measurement units (IMUs) and/or other sensors 20. Regardless of the kind of vehicle sensors 20 used, the vehicle telemetry data is crowdsourced data collected from the vehicles 18 at predetermined intervals (e.g., every three seconds) when the vehicle 18 is on. The telemetry data includes lane data, and the lane data includes information about lane lines of the roadway within the predetermined region.

The system 10 may further include or be in communication with a telecommunication system 22. The vehicle sensors 20 are therefore in communication with the controller 12 through the telecommunication system 22. The telecommunication systems 22 may include, for example, one or more telecommunication towers 24 and/or one or more telecommunication satellites 26 to transmit the vehicle telemetry data from the vehicle 18 to a telemetry database 28. The telemetry database 28 may be part of the telecommunication system 22 and is in communication with the controller 12. As such, the vehicle telemetry data may be transmitted from the vehicles 18 to the controller 12 through the telecommunication system 22.

The system 10 may further include or be in communication with a map database 30. The map database stores map data. The map data includes road-network topology data. The road-network topology data includes a map with attribute information about the roadway within the predetermined region. Because the map database 30 is in communication with the controller 12, the map data may be transmitted from the map database 30 to the controller 12.

FIG. 2 is a flowchart of a method 100 for estimating lane lines. The method 100 begins at block 102. This method 100 uses telemetry data and map data to determine the shape, geometry, and extent of lane lines of a roadway within a predetermined region. The method 100 begins at block 102. At block 102, the controller 12 receives telemetry data and map data. As mentioned above, the telemetry data may be crowdsourced from vehicles 18. The telemetry data includes vehicle positional data, and the vehicle positional data may include GPS data. The telemetry data includes telemetry points. The map data includes road-network topology data, and the road-network topology data includes a map with attribute information about the roadway within the predetermined region, such as direction of travel. Further, at block 102, the controller 12 matches the telemetry data with the map data to generate map-matched telemetry data.

Block 102 also entails executing the SGOUT. The output of the SGOUT is used to generate the graph of the perpendicular distance versus the density of the map-matched telemetry data discussed above. The SGOUT begins by aggregating the map-matched telemetry data into segments. Then, the controller 12 finds the distributions of each of the aggregated segments. The controller 12 finds all distributions and peaks for each distribution. To find the distribution, the controller 12 may find the peak in each of the aggregated segments. The mode size is determined based on the estimated lane width. The upper limit of the distributions of each aggregated segment is equal to the peak at a corresponding aggregated segment plus a predetermined maximum value. The lower limit of the distributions of each aggregated segment is equal to the peak at a corresponding segment minus a predetermined minimum value. The controller 12 then performs a mode shift. Performing a mode shift entails finding the local maximum in each mode. To do so, the controller 12 may calculate the Gaussian kernel, the weighted mean density, and the mode density of the map-matched telemetry data. Next, the controller 22 estimates statistical parameters of the map-matched telemetry data for each Gaussian distribution. As non-limiting examples, the statistical parameters may include the mean and the standard deviation of the map-matched telemetry data. The controller 12 then determines undersampling and oversampling of the map-matched telemetry data using the statistical parameters. The mean and the standard deviation of the map-matched telemetry data of the map-matched telemetry data is used to generate a new distribution with Equal Mode Density. Undersampling is performed with the high-density mode, and the oversampling is performed with the low-density mode. The undersampling and oversampling of the map-matched telemetry data may be used as an input of the graph of the perpendicular distance versus the density of the map-matched telemetry data as discussed above. This graph, as discussed above, is used to determine the shape, location, and extent of the lane lines of the roadway within the predetermined region. The SGOUT may be applied to a Gaussian Mixture Model (GMM) and a lane-point detection (LPD) model. The GMM and LDP could be executed simultaneously to estimate the first set of lane line points (set1) and the second set of lane line points.

Block 104 entails determining, using a Gaussian Mixture Model (GMM), a first set of lane line points relating to the lane lines of the roadway within the predetermined region. The controller 12 may execute the GMM. To do so, the controller 12 determines a perpendicular distance from each of the telemetry points to a virtual line connecting an adjacent pair of the plurality of LIDAR points. The controller 12 then generates a graph of the perpendicular distance versus the density of the map-matched telemetry data. This graph also includes the output of a synthetic gaussian oversampling undersampling technique (SGOUT) mentioned above. The controller 12 then determines the peaks of the graph. Further, the controller, 12 identifies the high-density area (e.g., high-density clustering) of the map-matched telemetry data using the peaks of the graph. Using the identified the high-density area of the map-matched telemetry data using, the controller 12 then performs line interpolation to determine the center lines of a lane and the lane edges of a lane. In other words, the controller 12 then determines the shape, location, and extent of the lanes lines of the roadway within the predetermined region. The GMM may be used for multi-lane roadways. A Gaussian Core Model (GCM) may be used for a single-lane roadway. In such a case, a linear interpolation may be used to estimate the lane lines of the roadway. In summary, the GMM or the GCM determines a first set of lane line points relating to the lane lines of the roadway within the predetermined region.

Block 106 entails executing the lane-point detection (LPD) model. To execute the LPD model, the controller determines a local density map of the map-matched telemetry data (i.e., embedding generation). Further, the controller 12 divides the map data into a predetermined number of one-meter cross-sections. The controller 12 then determines and graphs the local density of the map-matched telemetry data along the one-meter cross-sections of the map. Next, the controller 12 applies a second-order derivative filter to the density distribution along the predetermined number of cross-sections to determine a gradient of the local density map of the map-matched telemetry data. Then, the controller 12 uses the LPD model to determine a second set of lane line points relating to the lane lanes of the roadway within the predetermined region using the gradient of the local density map, nominal path of the roadway within the predetermined region using the gradient of the local density map, and a plurality of points attributes of the second set of lane line points. The point attributes of the second set of lane line points are used to determine a confidence level of the second set of lane line points. As non-limiting examples, the point attributes (e.g., peak properties) include peak heights, prominence, width, density, and gradient. The peak properties are indicators of changing lane configuration. The peak properties may therefore be used to detect how many lanes are included in the roadway.

Block 108 entails a point anomaly detection and correction process. In process, the controller 12 detects anomalies in the second set of lane line points relating to the lane lanes of the roadway within the predetermined region.

FIG. 3 is a flowchart illustrating the point anomaly detection and correction process 200. The process 200 begins at block 202. Block 202 includes executing the LPD model as discussed above. Then, the process 200 continues to block 204. At block 204, the controller 12 detects the lanes per cross-section of the map. Next, the process 200 continues to block 206. At block 206, the controller 12 determines the point attributes (i.e., point peak properties) as discussed above. The process 200 then continues to block 208. At block 208, the controller 12 detects the configurations of the lanes per cross-section using the point peak properties. The point peak properties are indicators of changing lane configuration. Then, the process 200 proceeds to block 210. At block 210, the controller 12 performs a consistency check. To do so, the controller 12 may compare detected lanes with some stored lanes database. If the detected lanes are consistent with the stored lanes database, then the process 200 proceeds to block 212. At block 212, the controller 12 designated the detected lane as the final lanes. If the detected lanes are not consistent with the stored lanes database, then the process 200 proceeds to block 214. At block 214, the controller 12 executes a lane point correction function. To do so, the controller 12 may use the peak properties or execute a lane width logic.

As discussed above, the controller 12 may correct the lane points using the peak properties. The peak properties (e.g., position, peak width, peak height, etc.) provide information about potential changes in the lane configuration. The width of the peak correlates to the lane width. The controller 12 may therefore compare the peak width of each of the second set of lane line points with a predetermined width threshold (e.g., 19.5 pixels). If the width of one or more peak points is greater than the predetermined width threshold, then the controller 12 determines that a change in lane configuration has occurred along the roadway or that a lane is missing. In such a case, the controller 12 corrects that lane line point. The information on the lane segments with sparse density is used to reconstruct and determine the correct lane line point locations. Specifically, this information is used to detect lane points to adjust, determine new point locations using peak properties, and determine the direction and placement of the new points (e.g., left or right lane edge, bi-directional or turn lane). For a bi-directional or turn lane correction, the controller 12 may use the following equations:

$$\text{Adjustment} = Af^*(Wp - 19.5)/2$$

$$\text{New point } 1 = Lp + \text{adjustment}$$

$$\text{New point } 2 = Lp - \text{adjustment}$$

where:
Wp is the peak width of the point to adjust;
Lp is the pixel location of the point to adjust;
Af is the adjustment factor (e.g., 2.55);

Adjustment is the adjustment magnitude that the point needs to be adjusted;

New point 1 is a first new lane line point after adjustment; and

New point 2 is a second new lane line point after adjustment.

For missing left or right lane correction, the controller 12 may use the following equations:

$$\text{Adjustment} = Af * (Wp - 19.5) \qquad 10$$

$$\text{New point (left)} = Lp - \text{adjustment}$$

$$\text{New point (right)} = Lp + \text{adjustment} \qquad 15$$

where:

Wp is the peak width of the point to adjust;

Lp is the pixel location of the point to adjust;

Af is the adjustment factor (e.g., 2.55);

Adjustment is the adjustment magnitude that the point needs to be adjusted;

New point (left) is a new left lane line point after adjustment; and

New point (right) is a new right lane line point after adjustment.

Alternatively, the controller 12 may evaluate and correct the lane line points using a lane width logic. To do so, the controller 12 uses a gradient-based model to detect the lane line points. Then, the controller 12 removes the low-confidence detected lane line points. Next, the controller 12 checks the distance between consecutive (i.e., immediately adjacent) lane line points. If the distance between consecutive lane line points is greater than a predetermined distance threshold, then the controller 12 inserts a virtual lane line point between the consecutive lane line points.

After correcting the lane line points, the process 200 continues to block 216. At block 216, the controller 12 outputs the corrected lane line points with the corrected geometries. The process 200 then returns to block 210.

Referring again to FIG. 2, the method 100 also includes block 110. At block 110, the controller 12 uses a lane-point clustering (LPC) model to determine a plurality of lane lines of the roadway based on the first set of lane line points and the second set of lane line points. The LPC model includes detecting the lane line points (i.e., the first set of lane line points and the second set of lane line points). The lane line point may be detected based on lane line point gradients across cross-sections of the map of the roadway. The lane line points are then grouped based on changes in lane number or configuration. In other words, the lane line points are clustered per cross-sectional segment of the map. In this process, outline lane line points may be removed. The controller 12 then assigns clusters to lane line points in the same segment using, for example, a centroid-based algorithm using a flat kernel. The controller 12 then uses these map clusters to determine the shape, location, and extent of the lane lines of the roadway (i.e., center lane lines, edge lanes, etc.). The controller 12 may then command the one or more vehicles 18 to move along the roadway by considering the lane lines. For example, the vehicle 18 may autonomously maintain itself within one lane while moving forward at a predetermined speed.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for estimating lane lines, comprising:

receiving, by a controller, telemetry data, wherein the telemetry data includes vehicle positional data, the vehicle positional data includes GPS data, and the lane data includes information about lane lines of a roadway within a predetermined region;

receiving, by the controller, map data, wherein the map data includes road-network topology data, and the road-network topology data includes a map with information about the roadway within the predetermined region;

matching the telemetry data with the map data to generate map-matched telemetry data;

determining, using a Gaussian Mixture Model (GMM), a first set of lane line points derived from the map-matched telemetry data, the first set comprising probabilistic mixture-model lane line points;

determining, using a lane-point detection (LPD) model, a second set of lane line points independently derived from the map-matched telemetry data, the second set comprising spatial gradient-based lane-point detections; and determining, using a lane-point clustering (LPC) model, a plurality of lane lines by clustering the first set of lane line points and by clustering the second set of lane line points and jointly clustering the first set and the second set of clustered lane line points to determine the plurality of lane lines.

2. The method of claim 1, further comprising determining a local density map of the map-matched telemetry data.

3. The method of claim 2, further comprising dividing the map data into a predetermined number of cross-sections.

4. The method of claim 3, further comprising determining a density distribution along the predetermined number of cross-sections using the local density map of the map-matched telemetry data.

5. The method of claim 4, wherein executing the LPD model comprises applying a second-order derivative filter to the density distribution along the predetermined number of cross-sections to determine a gradient of the local density map of the map-matched telemetry data.

6. The method of claim 5, wherein executing the LPD model includes determining the second set of lane line points relating to the lane lines of the roadway within the predetermined region using the gradient of the local density map.

7. The method of claim 6, wherein executing the LPD model includes determining a nominal path of the roadway within the predetermined region using the gradient of the local density map.

8. The method of claim 7, wherein executing the LPD model includes determining a plurality of points attributes of the second set of lane line points to determine a confidence level of the second set of lane line points, and the LPC model includes detecting the lane line points and grouping the lane line points based on changes in lane number or configuration.

9. The method of claim 1, wherein the map data is high-definition (HD) map data, and executing the GMM comprises:

determining a perpendicular distance from each of the plurality of telemetry points to a virtual line connecting an adjacent pair of a plurality of HD map points;

generating a graph of the perpendicular distance versus a density of the map-matched telemetry data;

identifying a plurality of peaks in the graph of the perpendicular distance versus the map-matched telemetry data;

determining a plurality of high-density areas using the plurality of peaks in the graph of the perpendicular distance versus a density of the map-matched telemetry data;

determining a plurality of center lines of the roadway within a predetermined region; and determining a plurality of lane edges of the roadway within a predetermined region.

10. The method of claim 1, further comprising executing a synthetic gaussian oversampling undersampling technique (SGOUT) to determine oversampling and undersampling of telemetry data.

11. A system for estimating lane lines, comprising:

a controller including a processor and a tangible, non-transitory, machine-readable medium in communication with the processor, wherein the controller is programmed to:

receive telemetry data, wherein the telemetry data includes vehicle positional data, the vehicle positional data includes GPS data, and the lane data includes information about lane lines of a roadway within a predetermined region;

receive map data, wherein the map data includes road-network topology data, and the road-network topology data includes a map with information about the roadway within the predetermined region;

match the telemetry data with the map data to generate map-matched telemetry data;

determine, using a Gaussian Mixture Model (GMM), a first set of lane line points derived from the map-matched telemetry data, the first set comprising probabilistic mixture-model lane line points;

determine, using a lane-point detection (LPD) model, a second set of lane line points independently derived from the map-matched telemetry data, the second set comprising spatial gradient-based lane-point detections; and determine, using a lane-point clustering (LPC) model, a plurality of lane lines by clustering the first set of lane line points and by clustering the second set of lane line points and jointly clustering the first set and the second set of clustered lane line points to determine the plurality of lane lines.

12. The system of claim 11, wherein the controller is programmed to determine a local density map of the map-matched telemetry data.

13. The system of claim 12, wherein the controller is programmed to divide the map data into a predetermined number of cross-sections.

14. The system of claim 13, wherein the controller is programmed to determine a density distribution along the predetermined number of cross-sections using the local density map of the map-matched telemetry data.

15. The system of claim 14, wherein executing the LPD model comprises applying a second-order derivative filter to the density distribution along the predetermined number of cross-sections to determine a gradient of the local density map of the map-matched telemetry data.

16. The system of claim 15, wherein executing the LPD model includes determining the second set of lane line points relating to the lane lanes of the roadway within the predetermined region using the gradient of the local density map.

17. The system of claim 16, wherein executing the LPD model includes determining a nominal path of the roadway within the predetermined region using the gradient of the local density map.

18. The system of claim 17, wherein executing the LPD model includes determining a plurality of points attributes of the second set of lane line points to determine a confidence level of the second set of lane line points.

19. The system of claim 11, wherein the map data is a high-definition (HD) map data, the HD map data includes a plurality of HD map points along the roadway within the predetermined region, the telemetry data includes a plurality of telemetry points, and executing the GMM comprises:

determining a perpendicular distance from each of the plurality of telemetry points to a virtual line connecting an adjacent pair of the plurality of HD map points;

generating a graph of the perpendicular distance versus a density of the map-matched telemetry data;

identifying a plurality of peaks in the graph of the perpendicular distance versus a density of the map-matched telemetry data;

determining a plurality of high-density areas using the plurality of peaks in the graph of the perpendicular distance versus a density of the map-matched telemetry data;

determining a plurality of center lines of the roadway within a predetermined region; and determining a plurality of lane edges of the roadway within a predetermined region.

20. The system of claim 11, wherein the controller is programmed to execute a synthetic gaussian oversampling undersampling technique (SGOUT) to determine oversampling and undersampling of telemetry data.

* * * * *